United States Patent [19]

Miesch

[11] 4,262,401
[45] Apr. 21, 1981

[54] HYDROSTATIC SUPPORT MEMBER
[75] Inventor: Hans Miesch, Zurich, Switzerland
[73] Assignee: Escher Wyss Limited, Zurich, Switzerland
[21] Appl. No.: 72,588
[22] Filed: Sep. 5, 1979
[30] Foreign Application Priority Data
  Sep. 20, 1978 [CH] Switzerland ............... 9810/78
[51] Int. Cl.³ ........................................... B21B 31/32
[52] U.S. Cl. ............................................ 29/116 AD
[58] Field of Search ...... 29/116 AD, 116 R, 113 AD, 29/113 R; 91/488; 92/52, 178

[56] References Cited
U.S. PATENT DOCUMENTS

| 3,802,044 | 4/1974 | Spillmann et al. | 29/116 AD |
|---|---|---|---|
| 3,846,883 | 11/1974 | Biondetti | 29/116 AD |
| 4,064,607 | 12/1977 | Wolf | 29/116 AD |
| 4,114,959 | 9/1978 | Christ | 29/116 AD |
| 4,186,472 | 2/1980 | Biondetti | 29/116 AD |

Primary Examiner—James Kee Chi
Attorney, Agent, or Firm—Robert A. Ostmann

[57] ABSTRACT

In a hydrostatic support member with at least one pressure pocket in the head portion of the support member, the or each pressure pocket opening opposite a surface which is to be supported, the inner side of the lining wall which defines the pressure pocket relative to the environment of the support member is inclined relative to the pressure axis of the support member, so that the profile of the pressure pocket becomes larger towards its base. The outside of the lining wall extends relative to the inner side in such a way that when this wall is lowered towards the base the hydrostatically effective surface of the head portion, facing the surface which is to be supported, increases in size.

A method of producing or finishing the support member according to the invention is proposed: The support member is first prefabricated with the head portion having a relatively small hydrostatically effective surface, compared with an operational one, the walls having been made higher. It is then used under conditions which simulate actual operation. The prefabricated walls of the at least one pressure pocket being so lowered by a lapping type process. As the hydrostatically effective surface of the head portion increases in size during this lowering, the lapping stops automatically at the stage when the optimum operational hydrostatically effective surface for the head portion has been obtained.

3 Claims, 7 Drawing Figures

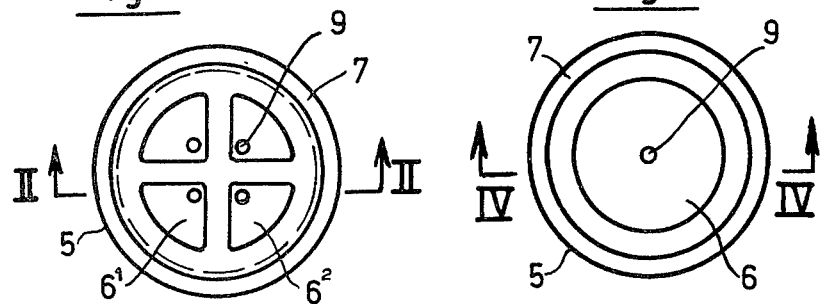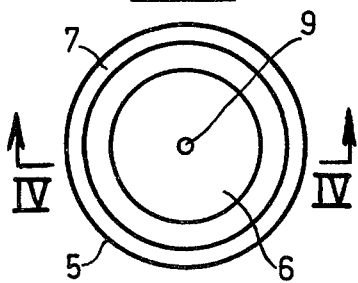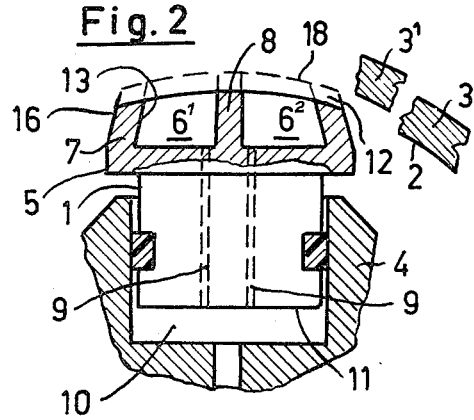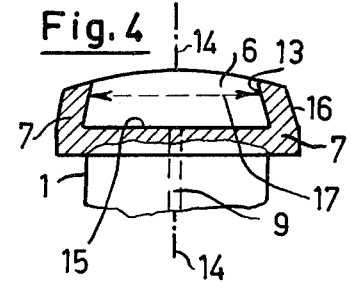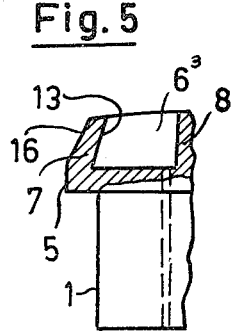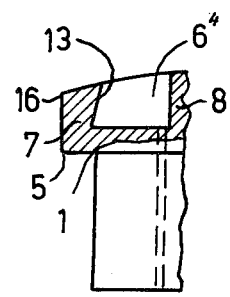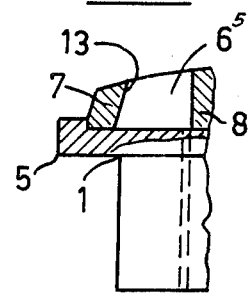

HYDROSTATIC SUPPORT MEMBER

BACKGROUND OF THE INVENTION

The invention relates to a hydrostatic support member for supporting a surface which is slidably mounted relative to the support member, via a film of fluid located between a head portion of the support member facing the surface and the surface itself, wherein for creating pressure in the film of fluid the head portion comprises at least one pressure pocket which opens opposite the surface and is defined relative to the environment of the support member by a lining wall, the or each pressure pocket being supplied with a pressure fluid by a feed line passing through the support member from a pressure chamber which is provided in a stationary carrier in order to actuate the support member and which is acted upon by the pressure fluid.

Support members of this kind are known, for example, from U.S. Pat. No. 3,802,044, in which case they are used for supporting a roller shell mounted so as to be rotatable about a carrier. The support member is embedded in the carrier like a piston acting relative to the pressure chamber and is forced towards the inner surface of the roller shell with a force corresponding to a function of the pressure in the pressure chamber and the hydrostatically effective surface of the support member opposite the pressure chamber. However, the pressure fluid then flows out of the pressure chamber, through the feed line and into the pressure pocket, where a pressure builds up which, as a function of a correspondingly large hydrostatically effective surface of the head portion, produces a force which is capable of pushing the head portion away from the roller shell, with the result that a gap is formed between the inner wall of the roller shell and the lining wall which defines the pressure pocket relative to the environment of the support member, through which gap the pressure fluid flows away into the surrounding area, i.e. into the space between the inner wall of the roller shell and the carrier. During this passage of the pressure fluid, there is a drop in pressure, from the pressure of the pressure fluid fed in the pressure pocket and the atmospheric pressure at the outer edge of the lining wall defining the pressure pocket. A film of fluid is formed between the head portion and the inner wall of the roller shell, the thickness of this film corresponding to the clearance between the inner wall of the roller shell and the wall which defines the pressure pocket.

It is known that, in order to form a film of fluid capable of bearing a load, there must be hydrostatic equilibrium between the hydrostatically effective surface of the head portion and the hydrostatically effective surface of the support member opposite the pressure chamber. Otherwise, there would be metal friction between the roller shell and the head portion. However, if there is an unbalance with regard to the head portion, i.e. if the hydrostatically effective surface of the head portion is too large, an excessively large gap is formed between the parts, resulting in too great a throughflow, i.e. too great a consumption of the pressure fluid. This consumption then becomes unacceptable, particularly when high pressures are used. It is evident that minimum consumption of pressure fluid is desirable. It is possible to calculate the optimum hydrostatically effective surface of the head portion in order to minimise the pressure fluid consumption. To do so, not only the surface of the opening of the pressure pocket, but also the width of the lining wall at the gap in the radial direction with respect to the pressure axis of the support member have to be calculated. However, in the production of the head portion, as regards the hydrostatically effective surface, one is limited by the technilogical production limits, as the tolerances to be adhered to are very narrow. Consequently, the degree of reproducibility is also poor.

SUMMARY OF THE INVENTION

The aim of the invention is to provide a hydrostatic support member with which minimum pressure fluid consumption can be achieved and which can be produced with the required accuracy.

According to the invention, this aim is achieved, in a support member of the kind described herein before, in that the inner side of the lining wall defining the or each pressure pocket relative to the environment is inclined towards the pressure axis of the support member, and that, viewed in profile, the pressure pocket increases in size towards its base, whilst the outside of the lining wall extends relative to the inner side in such a way that, as this wall decreases in height towards the base, the hydrostatically effective surface of the head portion, facing the surface which is to be supported, increases in size.

This construction of the walls of the pressure pocket or pockets means that the higher the wall, the smaller the hydrostatically effective surface of the head portion of the support member. Conversely, as the wall is lowered, i.e. as the wall becomes lower in height, the hydrostatically effective surface of the head portion increases accordingly.

This is made use of in the production or accurate finishing of the support member. According to the invention it is proposed that, in one manufacturing stage, the wall or walls defining the or each pressure pocket are first made slightly higher, so that the prefabricated hydrostatically effective surface of the head portion is slighly smaller than the hydrostatically effective surface of the support member opposite the pressure chamber, and it is also proposed that, for the finishing process, the prefabricated support member is put into its operational position relative to a surface which is to be supported, whereupon the wall or walls are lowered by lapping-type friction on the surface, thus causing simultaneous enlargement of the hydrostatically effective surface of the head portion until this surface has increased to the extent that it is in hydrostaic equilibrium with the hydrostatically effective surface of the support member opposite the pressure chamber.

At this moment, the lowering stops automatically, as the precise hydrostatically effective surface on the head portion which results in the formation of the film of fluid in the gap between the walls of the pressure pocket or pockets and the surface to be supported has been obtained.

To facilitate this lowering, it is advantageous for the wall or walls defining the or each pressure pocket to be made from a material which is easy to remove, at least in an area facing the surface which is to be supported.

BRIEF DESCRIPTION OF THE DRAWING

The object of the invention is hereinafter described and explained more fully with reference to some exemplary embodiments shown in the drawings, wherein:

FIG. 1 and 3 each show a plan view of an exemplary embodiment,

FIG. 2 shows a partial section on the line II—II in FIG. 1, with parts of a carrier and a roller shell, FIG. 4 shows a partial section on the line IV—IV in FIG. 3, FIGS. 5, 6 and 7 show further exemplary embodiments, each in partial longitudinal section.

DESCRIPTION OF THE PREFERRED EMBODIMENT

A hydrostatic support member 1 is provided for supporting a surface 2. In the example shown, it is the inner surface of a roller shell 3, shown as a fragment, which is mounted so as to be rotatable about an axial stationary carrier 4. The surface 2 to be supported slides over the support member via a film of fluid which is present between a head portion 5 of the support member facing the surface 2 and the surface 2 itself. In order to establish a pressure in the film of fluid which will prevent metal friction between the head portion 5 and the surface 2, at least one pressure pocket 6 is provided in the head portion, the or each pressure pocket being open towards the surface to be supported and being defined by a lining wall 7 relative to the environment of the support member.

The support member shown in FIGS. 1 and 2 and FIGS. 5 to 7 comprises four pressure pockets in the head portion, which are defined relative to one another by intermediate walls 8. Various of these pockets are identified by the numerals $6^1$, $6^2$, $6^3$, $6^4$ and $6^5$ in the drawing figures.

A pressure fluid is fed into the or each pressure pocket 6 through a feed line 9 which passes through the support member into a pressure chamber 10 which is provided in the carrier 4 for the purpose of actuating the support member, and in which the support member is embedded in the manner of a piston. This pressure chamber 10 is acted upon by the pressure fluid, whereby the support member is pushed towards the surface 2 to be supported, with a force which corresponds to the pressure in the pressure chamber 10 and the hydrostatically effective surface 11 of the support member opposite the pressure chamber. The pressure fluid then flows out of the pressure chamber, through the feed line 9, into the pressure pocket 6, where a pressure is built up which, together with the hydrostatically effective surface 18 of the head portion 5, produces a force which pushes the support member or the head portion thereof away from the surface 2 which is to be supported, so that the pressure fluid flows out through a gap 12 thus formed between the lining wall 7 defining the pressure pocket 6 relative to the environment of the support member and the surface 2 which is to be supported, and flows into the free space around the support member, and where the pressure in the film of fluid, or the pressure fluid, is reduced to atmospheric pressure, at the outer edge of the gap 12 or lining wall 7.

At the wall 7 defining the associatd pressure pocket 6 from the environment of the support member, the inner side 13 is inclined relative to the pressure axis 14 of the support member in such a way that the profile 17 of the pressure pocket 6 becomes larger towards its base 15. The outside 16 of the lining wall 7 extends relative to the inner side 13 in such a way that when this wall is lowered or, in the case of a plurality of pressure pockets provided in the head portion 5, when the intermediate walls 8 defining the pressure pockets from one another are lowered, towards the base 15 of the pressure pocket or pockets, the hydrostatically effective surface 18 of the head portion 5, facing the surface 2 which is to be supported, increases in size. As can be seen from the exemplary embodiments, the outer side 16 may extend parallel, convergently or divergently with respect to the inner side 13. It is even possible for the outer side 16 to be inclined away from the pressure axis 14 of the support member and yet for the hydrostatically effective surface 18 of the head portion to increase in size as the wall 7 is lowered towards the base of the pressure pocket. This is the case when the angle at which the outer side 16 is inclined away from the pressure axis 14 is substantially smaller than the angle at which the inner side 13 is inclined towards the pressure axis. This possible embodiment is not shown in the drawings.

As is shown particularly clearly by dotted lines in FIG. 2, the design of the wall of the pressure pockets described above means that the higher the walls 7, 8, the small the hydrostatically effective surface 18 of the head portion 5. As these walls are lowered towards the base 15 of the pressure pocket, i.e. as they become lower, the hydrostatically effective surface of the head portion becomes correspondingly larger.

This alters not only the geometry of the opening of the pressure pocket, but also the ratio of the surface area of this opening to the surface area of the gap between the wall 7 or wall 8 and the surface 2 which is to be supported. Thus, the sealing characteristics of this gap 12 are also altered.

In the production or finishing of the support member, this fact is made use of in order to obtain an optimum hydrostatically effective surface of the head portion 5 in precisely proportionally exact dimensions to provide the minimum thickness of the film of fluid so that the pressure fluid consumption is minimal.

In one production stage, the wall 7 or 8 defining the pressure pocket or pockets 6 is made higher, as is schematically shown by dotted lines in FIG. 2, so that the hydrostatically effective surface of the head portion 5 is slightly smaller than the hydrostatically effective surface 11 of the support member opposite the pressure chamber 10. This prefabricated and otherwise finished support member is inserted in its operational position relative to a surface to be supported, for the finishing process. This means that the prefabricated support member is, for example, inserted in an apparatus to simulate a pressure roller, for example, in which the support member is intended to be used.

The finishing process is shown in FIG. 2. The prefabricated hydrostatically effective surface of the head portion, shown by dotted lines and bearing reference numeral 18, is smaller than the hydrostatically effective surface 11 of the support member opposite the pressure chamber 7. Thus, at this stage, it is hydrostatically less effective, so that the force with which the support member is pushed relative to the rotating shell portion, a fragment of which is marked $3^1$ in the drawing of this stage, is greater than the hydrostatic force acting on the surface 18, with which the support member is pushed away from the shell. Thus, a lapping-type friction is produced between the rotating shell and the walls 7 and 8 of the head portion which define the pressure pockets 6. This friction gradually erodes the walls of the pressure pockets, whilst the hydrostatically effective surface 18 of the head portion gradually increases in size, with the result that the force with which the head portion 5 of the support member is pushed away from the shell gradually increases. This lapping-type friction of the walls of the pressure pockets against the shell lasts until the hydrostatically effective surface has become so large that the force pushing the head portion 5 away from the shell is large enough to be in equilibrium with the force with which the support member is pushed out of the pressure chamber 10 towards the shell. At the precise moment when this equilibrium is obtained, the pressure fluid begins to flow through the gap 12 formed between the walls and the shell, and a film of fluid is formed which separates these surfaces from each other and thus prevents any further lapping-type friction between the surfaces, so that the walls are not eroded any further.

The finishing of the support member as described above can also be carried out directly, for example, in a pressure roller for which the support member is intended. For this purpose, in particular, it is advantageous to produce at least that part of the walls of the pressure pockets which is facing the shell and is to be removed, from an easily removable material, so that the shell is not damaged by the friction during the lapping process. Such a material could be, for example, graphite or another easily removable material. A support member of this kind is shown in FIG. 7, in particular, in which the walls 7, 8 are made from a different material, i.e. a softer, more easily removable material than the rest of the material used to produce the head portion 5 or remainder of the support member, or the material of the shell.

The invention relates both to support members intended for supporting a smooth surface and to support members wherein the head portion, viewed from above, is not round in shape, e.g. rectangular or oval, and it also relates to so-called supporting or striking strips.

I claim:

1. A fluid pressure actuated hydrostatic support member for supporting an element which slides relatively to the support member via an interposed film of fluid, the support member having a head portion containing at least one pressure pocket which opens toward said element and is bounded at the outside by a lining wall having an interior surface which faces the pocket and an exterior surface which is exposed to the environment surrounding the support member, said interior surface being inclined relative to the pressure axis of the support member so that the profile of the pocket increases towards its base, and the shapes of said two surfaces being so correlated that, when the lining wall is lowered towards the base, the hydrostatically effective area of the head portion which faces said element increases.

2. A hydrostatic support member as defined in claim 1 in which said pressure pocket is bounded by walls made of an easily removable material.

3. A method of making a fluid pressure actuated hydrostatic support member intended to support an element which slides relatively to the support member via an interposed film of fluid, the method comprising the steps of
   a. fabricating a support member including a head portion having a support surface for carrying said film and which contains at least one open pressure pocket, and a piston portion having a pressure responsive actuating surface which is arranged to urge the support member toward the element to be supported,
   b. the pressure pocket being bounded by a lining wall so shaped that both the profile of the pocket and the hydrostatically effective area of said support surface increase as the head is worn down, and
   c. the hydrostatically effective area of said support surface being slightly smaller than the hydrostatically effective area of said actuating surface so that the fabricated support member is incapable of creating said fluid film; and
   d. finishing said fabricated support member by utilizing same in hydrostatic support apparatus to support a sliding element,
   e. whereby lapping type friction between the element and the supporting surface of the support member wears down the head portion until the hydrostatically effective area of the support surface increases sufficiently to establish equilibrium between the opposing pressure forces acting on this surface and on the actuating surface and the support member becomes effective to create said fluid film.

* * * * *